(12) United States Patent
Miyawaki

(10) Patent No.: US 7,104,707 B2
(45) Date of Patent: Sep. 12, 2006

(54) LIGHT QUANTITY ADJUSTING DEVICE

(75) Inventor: Makoto Miyawaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/766,387

(22) Filed: Jan. 28, 2004

(65) Prior Publication Data

US 2004/0184800 A1 Sep. 23, 2004

(30) Foreign Application Priority Data

Feb. 3, 2003 (JP) .......................... 2003-025396

(51) Int. Cl.
*G03B 9/08* (2006.01)

(52) U.S. Cl. .................... 396/449; 396/463; 396/494; 396/508

(58) Field of Classification Search ................ 396/449, 396/451, 463, 464, 493, 494, 508
See application file for complete search history.

(56) References Cited

U.S. PATENT DOCUMENTS

| | | | | | |
|---|---|---|---|---|---|
| 4,693,580 | A | * | 9/1987 | Hanamori et al. | 396/508 |
| 4,772,904 | A | * | 9/1988 | Otsuka et al. | 396/508 |
| 5,548,367 | A | * | 8/1996 | Katagiri | 396/468 |
| 6,139,202 | A | * | 10/2000 | Depatie et al. | 396/449 |
| 6,340,252 | B1 | * | 1/2002 | Kawano | 396/463 |
| 2004/0062543 | A1 | * | 4/2004 | Miyawaki | 396/463 |

* cited by examiner

*Primary Examiner*—Christopher E Mahoney
(74) *Attorney, Agent, or Firm*—Cowan, Liebowitz & Latman, P.C.

(57) ABSTRACT

A device is provided having one or more light quantity controlling members that move into, and out of, an opening portion through which light passes and which is formed by at least a portion of inner diameter sides of a first stator and a second stator, thus controlling the amount of light passing therethrough. The one or more light quantity controlling members are disposed between the magnet and the second stator.

11 Claims, 5 Drawing Sheets

LIGHT QUANTITY ADJUSTING DEVICE

BACKGROUND OF THE INVENTION

1. Field of the Invention

The present invention relates to a light quantity adjusting device suitable for use in an image taking apparatus such as a digital still camera.

2. Related Background Art

FIG. 6 shows a configuration of a shutter apparatus provided in a conventional lens shutter camera. In FIG. 6, reference numeral 101 denotes a permanent magnet, reference numeral 102 denotes a driver lever, and reference symbol 102a denotes a driver pin that is provided in the driver lever 102. The driver lever 102 is fixed to the permanent magnet 101, and rotates integrally with the permanent magnet 101. Reference numeral 103 denotes a coil, reference numerals 104 and 105 denote stators that are made from a soft magnetic material and are excited by a coil 103. The stator 104 and the stator 105 are joined together at portions denoted by 104a and 105a, and are regarded as integrated from the perspective of a magnetic circuit. The stator 104 and the stator 105 are excited, and the permanent magnet 101 is rotationally driven within a predetermined angle range by energization of the coil 103. Reference numerals 106 and 107 denote shutter blades, and reference numeral 108 denotes a base plate. The shutter blades 106 and 107 are rotatably attached to pins 108a and 108b of the base plate 108 via hole portions 106a and 107a, respectively. Slots (narrow hole) 106b and 107b are slidably fitted onto the driver pin 102a. By rotating the driver lever 102 together with the permanent magnet 101, the shutter blades 106 and 107 are rotatably driven about the hole portions 106a and 107a as centers, and an opening. (not shown) opens and closes.

Other configurations include forming the permanent magnet by using a plastic magnet, and forming the permanent magnet integrally with the driver pin, in order to prevent increases in cost.

Reference numeral 109 denotes a front base plate that movably holds the shutter blades 106 and 107 between the front base plate 109 and the base plate 108. Reference numeral 110 denotes a rear base plate that rotatably holds the permanent magnet 101.

Incidentally, digital cameras have been spreading. The digital cameras use an image pickup element such as a CCD to photoelectricaly convert a subject to be photographed into still image information. The subject to be photographed is then recorded onto a recording medium. Operations relating to light exposure in this type of digital camera are explained below in brief.

First, a main power source is turned on before photography. When the image pickup element is placed in an operating state, the shutter blades are held in an open position at which it is possible to expose light to the image pickup element. Electric charge accumulation and emission transfer are thus repeated by the image pickup element, and observation of the field of view via an image monitor becomes possible. Next, a stop value and an exposure time amount are determined according to output from the image pickup element at the point when a shutter release button is pressed. For cases where it is necessary to close the aperture of an exposure opening based on the stop value and the exposure time amount, first the aperture blades are driven and a predetermined aperture value is set. Next, an instruction is given to the image pickup element, from which accumulated electric charge is being released, to start accumulating electric charge. An accumulation start signal used for the instruction also acts as a triggering signal to activate an exposure time control circuit at the same time. After passing through a predetermined amount of exposure time, the shutter blades are driven to a closed position at which light exposure to the image pickup element is blocked. Transfer of the electric charge that has accumulated in the image pickup element is performed after the light exposure to the image pickup is blocked. Image information is recorded in a recording medium through an image writing device. Prevention of light exposure to the image pickup element is performed during charge transfer in order to prevent the electric charge from changing due to excess light during the charge transfer.

In addition to shutter devices like that described above, there are also devices that possess a mechanism for preventing movement of an ND filter, and devices that possess a mechanism for preventing movement of an aperture regulating member having a small aperture size.

It is difficult to fabricate the shutter devices described above into thin, compact devices because of the height of the coil and that of the stator (axial direction dimension).

Further, a motor device of a camera is disclosed in Japanese Patent Application Laid-Open No. 2000-324787. However, multiple parts overlap in a rotation axis direction, such as a base plate that is fixed to a rotor and a cover plate, and therefore it is difficult to form parts existing in the axial direction into a thin configuration.

Furthermore, in Japanese Patent Application Laid-Open No. 2002-51524, a driver device is configured by overlapping a coil, a stator, and the like to make the thickness of a radial direction of a driver device small. Therefore, it is difficult to make the axial direction thin.

Still further, Japanese Patent Application Laid-Open No. 2002-51526 discloses a device in which a sliding surface is provided in a stator in order to maintain a gap between a magnet and stators that sandwich the magnet.

The devices described above thus show that it is difficult to configure a thin device in its axial direction. However, a device disclosed in Japanese Patent Application Laid-Open No. 2002-49076 by the applicants of the present invention can be given as a light quantity adjusting device whose axial direction has been made thin.

A configuration of the light quantity adjusting device disclosed in Japanese Patent Application Laid-Open No. 2002-49076 is thin in the axial direction, which is described below.

The light quantity adjusting device has a driver device, a base plate provided with an opening portion, and a light quantity controlling member. The driver device has a stator having a first stator and a second stator. The stators are provided with magnets. The magnets have surfaces in a direction perpendicular to a virtual axis of a center of rotation divided in an angular direction with respect to the virtual axis so as to be alternately magnetized in different polarities, and are rotatable about the center of rotation. A coil is disposed in an outer circumference or an inner circumference of the magnet. The first stator and the second stator oppose an upper surface, a lower surface, and an inner circumferential surface of the magnet, and are excited by the coil. The driver device also has a driver pin structured integrally with the magnet. The light quantity controlling member regulates an opening amount of the opening portion of the base plate, and is driven by the driver pin of the driver device.

By using a light quantity adjusting device having this type of configuration, it becomes possible to make a device that is relatively thin and compact compared to conventional devices.

SUMMARY OF THE INVENTION

However, two units are joined together with a configuration like that described above in which the driver device that drives the light controlling member, and the base plate on which the light quantity controlling member is provided are disposed overlapping in a light quantity axial direction. It is thus extremely difficult with this structure to meet demands to make the device additionally thinner. An object of the present invention is to make the device thinner, and lower in cost.

In order to attain the at least one of the above-mentioned objects, according to one embodiment of the present invention, there is employed a structure in which a light quantity adjusting device includes:

an annular rotary member having a magnetizing portion in a plane that is parallel to a radial direction of the annular rotary member;

an annular coil disposed in an outer diameter side or an inner diameter side of the rotary member;

an annular first stator that is disposed in a direction that is orthogonal to a radial direction of the rotary member, the annular first stator comprising first magnetic pole portions that oppose the rotary member;

an annular second stator disposed in a direction that is orthogonal to the radial direction of the rotary member, the annular second stator comprising second magnetic pole portions that oppose the rotary member from an opposite side of the first magnetic pole portions; and one or more light controlling members that are disposed between the rotary member and the first stator and/or between the rotary member and the second stator and that move into, and out of, a light path according to rotation of the rotary member, controlling the quantity of light passing therethrough, the light path being a path for light that passes through opening portions of the rotary member, the coil, the first stator, and the second stator.

Other objects and characteristics of the present invention will become clear through the description and the drawings shown below.

DESCRIPTION OF THE PREFERRED EMBODIMENTS

A first embodiment of the present invention is explained below.

Figure 1:
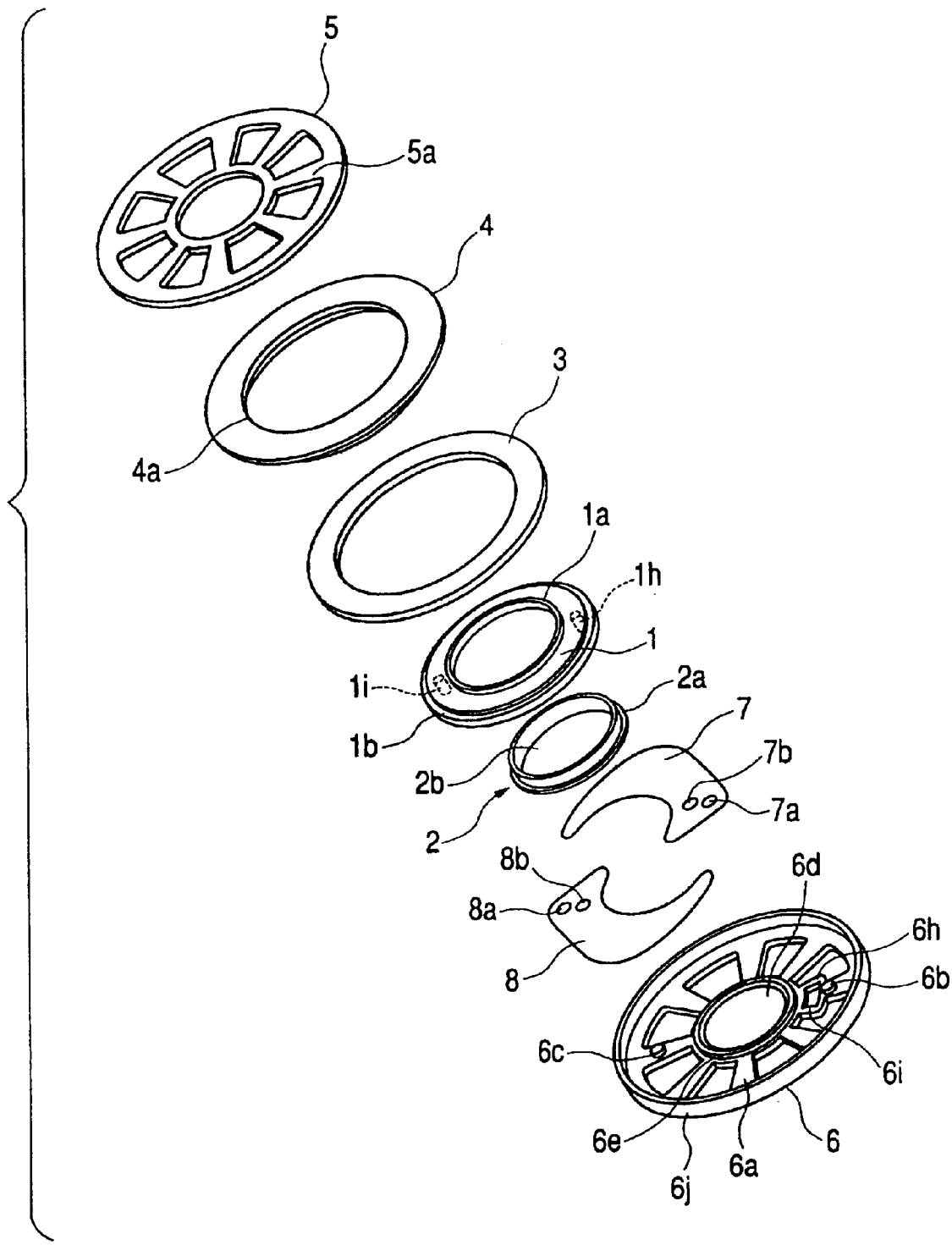
FIG. 1 is an exploded perspective view that shows a light quantity adjusting device according to a first embodiment of the present invention.
Figure 2:
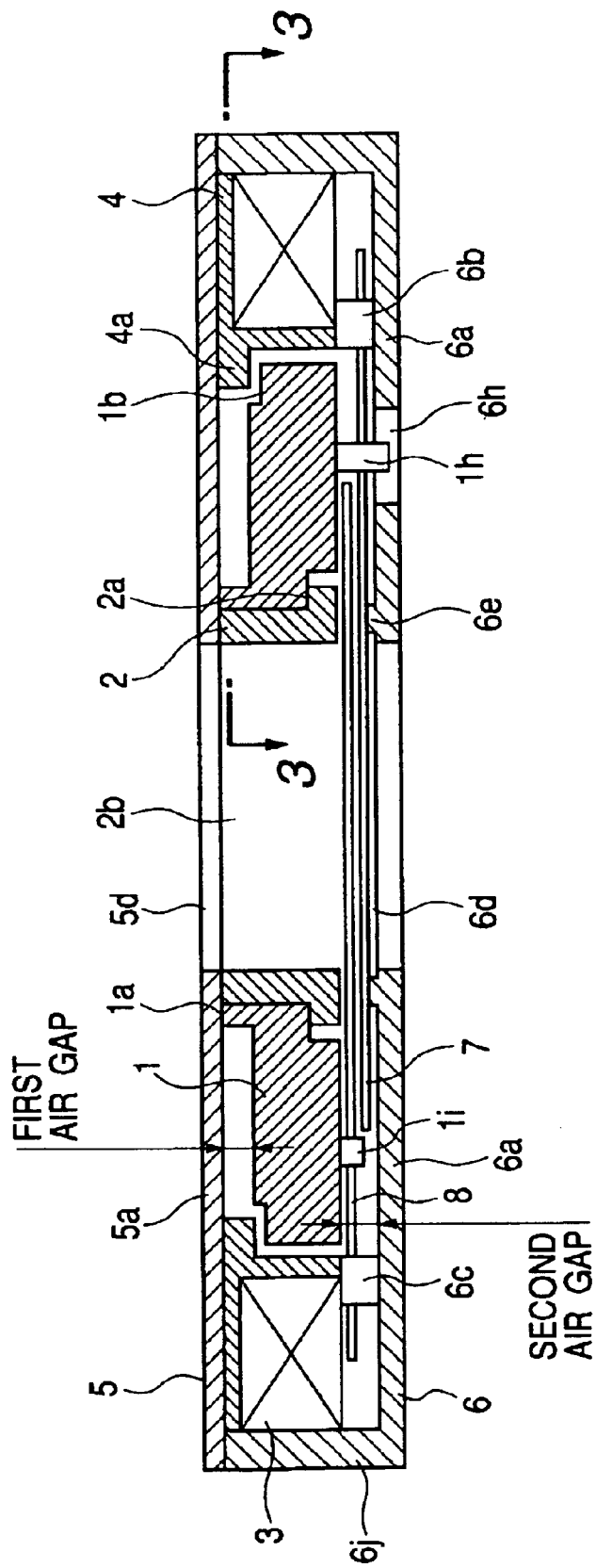
FIG. 2 is a cross sectional view of the light quantity adjusting device of FIG. 1.

FIG. 1 and FIG. 2 are diagrams that show a light quantity adjusting device according to the first embodiment. Specifically, FIG. 1 is an exploded view of the light quantity adjusting device, and FIG. 2 is a cross sectional view of the light quantity adjusting device.

Reference numeral 1 in the figures denotes a magnet that is an annular (ring shape) rotary member made from a plastic magnetic material. A rotation center at the center of the annular rotary member is taken as a virtual axis. One surface and another surface perpendicular to the virtual axis (in other words, surfaces that are parallel with an axial direction of the magnet) are divided 16 portions in a circumferential direction, and the 16 divisions alternately are magnetized in S and N poles with rear surfaces thereof being magnetized in opposite poles. Although the annular rotary member is divided into 16 portions and magnetized in this embodiment, the number of magnetized poles may be any other number equal to or greater than two. Furthermore, a structure may be adopted in which only a portion of the rotary member in the circumferential direction is configured by a magnet and other portion of the rotary body is configured by using a non-magnetic member. In this case, the number of magnetized poles may be a number equal to or greater than one. Reference numeral 1a denotes a convex portion that is formed in one surface of the magnet 1. The convex portion 1a slides smoothly on a first stator 5 when the magnet 1 is rotated. A step 2a is formed in a surface on a side opposite to that of the magnet 1, and comes in contact with a bearing 2. The convex portion 1a on one surface of the magnet 1 comes in contact with the first stator 5, and the step 2a on the other surface of the magnet 1 comes in contact with the bearing 2. The position of the magnet 1 in the axial direction is thus determined. Reference numeral 1b denotes a step, and the step 1b is superimposed with a flange portion 4a of a bobbin 4 when seen from the axial direction.

The bearing 2 is assembled with the magnet 1 and then fixed to the first stator 5. The magnet 1 has a receiving portion 2a for maintaining a predetermined gap between the first stator 5 and a second stator 6, thus performing positioning of the magnet 1. Further, the magnet 1 has an opening portion 2b. As discussed below, the opening portion 2b forms a maximum opening of the device along with an opening portion 6d of the second stator 6.

Reference numeral 3 denotes an annular coil. The annular coil 3 is wrapped around the bobbin 4 that is formed by using an electrically insulating material. The coil 3 is disposed outside of the magnet 1 in a radial direction, and a center position of the coil 3 is the same as that of the magnet 1. The bobbin 4 is formed having a cross section that is substantially "L" shaped in order to increase the spatial efficiency of the coil 3. In addition, the bobbin 4 has a flange portion 4a in order to prevent the incursion of light rays between the bobbin 4 and the step 1b of the magnet 1.

The annular first stator 5 is made by using a soft magnetic material, and possesses first magnetic pole portions 5a that are magnetically excited by the coil 3. The first magnetic pole portions 5a are configured by flat plate comb tooth shapes that oppose a first plane (one surface) perpendicular to the axial direction of the annular magnet 1 with a predetermined gap (first air gap), and extend in the radial direction of the magnet 1 and moreover, extend in an inner radial direction of the magnet 1. The number of the extending comb shape first magnetic pole portions 5a is equal to n/2 where n is taken as the number of magnetization divisions of the magnet 1. The first magnetic pole portions 5a are disposed evenly every 720/n degrees. It should be noted that there are 8 of the first magnetic pole portions 5a in this embodiment, and that the first magnetic pole portions 5a are disposed evenly every 45 degrees.

The first magnetic pole portions 5a are all magnetically excited to take on the same polarity by energizing the coil 3.

The annular second stator 6 is made by using a soft magnetic material, and possesses second magnetic pole portions 6a that are magnetically excited by energizing the coil 3. The second magnetic pole portions 6a are configured by flat plate comb tooth shapes that oppose a second plane (another surface) that is perpendicular to the axial direction of the annular magnet 1 with a predetermined gap (second air gap), and which extend in the inner radial direction of the magnet 1 and moreover, extend in an inner radial direction of the magnet 1. The number of the extending comb shape second magnetic pole portions 6a is equal to one-half of the n magnetization divisions of the magnet 1 (the number is 8 in this embodiment). The second magnetic pole portions 6a are disposed evenly every 720/n degrees (45 degrees in this embodiment).

The second magnetic pole portions 6a are all magnetically excited to take on the same polarity, and moreover, to take on a polarity that is opposite to that of the first magnetic pole portions 5a, by energizing the coil 3. The second magnetic pole portions 6a of the second stator 6 are formed in positions opposite to the first magnetic pole portions 5a of the first stator 5, thus sandwiching the magnet 1. The first stator 5 and the second stator 6 are magnetically coupled by a rising wall shape junction portion 6j of an outermost circumferential portion of the second stator 6. Of the first stator 5 and the second stator 6, only the rising wall shape junction portion 6j comes in contact with the coil 3. Further, reference numerals 6h and 6i denote stoppers. When the magnet 1 rotates, the maximum value for the amount of rotation of the magnet 1 is regulated by a driver pin 1h, discussed later, contacting the stopper 6i when the magnet 1 rotates in a clockwise direction, and by the driver pin 1h contacting the stopper 6h when the magnet 1 rotates in a counterclockwise direction.

Further, circular opening portions 5d and 6d are formed linking to distal end portions (inner circumferential portions) of the comb tooth shape first magnetic pole portions 5a, and to distal end portions (inner circumferential portions) of the comb tooth shape second magnetic pole portions 6a, respectively. A rail shape receiving surface 6e that projects out to the magnet 1 side is formed in the vicinity of the distal end portions of the second magnetic pole portions 6a in order to provide smooth rotation of the light quantity control blades, as discussed below.

The magnet 1, the coil 3, the first stator 5, and the second stator 6 configure a magnetic circuit. Magnetic flux cycles around the junction portion 6j, the first magnetic pole portions 5a, and the second magnetic pole portions 6a by flowing an electric current through the coil 3.

The driver pin 1h and a driver pin 1i are provided in the magnet 1 on the second stator 6 side. The driver pin 1h extends ahead of the center of the plate thickness of the second stator 6. The driver pin 1h comes in contact with the stoppers 6h and 6i of the second stator 6 to regulate the maximum rotational angle of the magnet 1 when the magnet 1 rotates. Light quantity control blades 7 and 8 are movably held in the second air gap between the second stator 7 and the magnet 1.

The light quantity control blades 7 and 8 are formed by using a non-magnetic material such as carbon, and have a sufficient light blocking property of blocking light rays. Circular holes 7a and 8a of the respective light quantity control blades 7 and 8, rotatably mate with pins 6b and 6c, respectively, of the second stator 6. Further, slots 7b and 8b of the respective light quantity controlling blades 7 and 8 slidably mate with driver pins 1h and 1i, respectively, of the magnet 1. The light quantity control blades 7 and 8 can thus be rotated according to the rotation of the magnet 1, and the opening amount of the opening portion 6d of the second stator 6 can be changed.

From the vantage point of efficiently utilizing magnetic flux, it is generally preferable that the magnet and the stator be disposed as near to each other as possible in a driver device that utilizes electromagnetic force like that of this embodiment in order to make as much of the magnetic flux generated by the coil as possible act on the magnet. On the other hand, there is a problem in that an adhesion force (cogging force) becomes larger as the magnet and the stator approach. The cogging force is generated at the position where the magnetic poles exist, and therefore exerts influence on the generated torque. Depending upon the circumstances, rotary irregularities may develop inhibiting smooth rotation, the cogging force may overcome the rotary force generated against the magnet upon startup, causing the rotary member not to move out, or other problems may develop.

It is thus necessary to suitably set the gap between the magnet and the stator, weakening the cogging force and making a balance with the torque that is generated.

Further, it is also necessary to form a gap between the stator and the magnet in order to prevent the rotating magnet from coming in contact with the stator due to the part manufacturing precision, the assembly precision, accumulation of change amounts in the shape of the components, and the like.

From the two necessities described above, an optimal air gap that is suited to the performance of the device is set between the magnet and the stator.

In view of the points described above, a second air gap is set between the magnet 1 and the second stator 6 in this embodiment. That is, the second air gap of this embodiment is set in order to avoid influence of the cogging force while taking into consideration the manufacturing precision, the assembly precision, and changes in shape of the components (the light quantity control blades 7 and 8).

Even if the air gap increases due to computing the thickness of, and a shape change amount for, the light quantity control blades 7 and 8, newly added between the magnet 1 and the stator 6 as described above, the amount of increase is small compared to the overall thickness present when the base plate and the driver device are separate, as described in Japanese Patent Application Laid-Open No. 2002-49076. An improvement in the space efficiency can therefore be achieved.

Operation of the magnet 1 by the coil 3 is explained next in brief.

Figure 3:
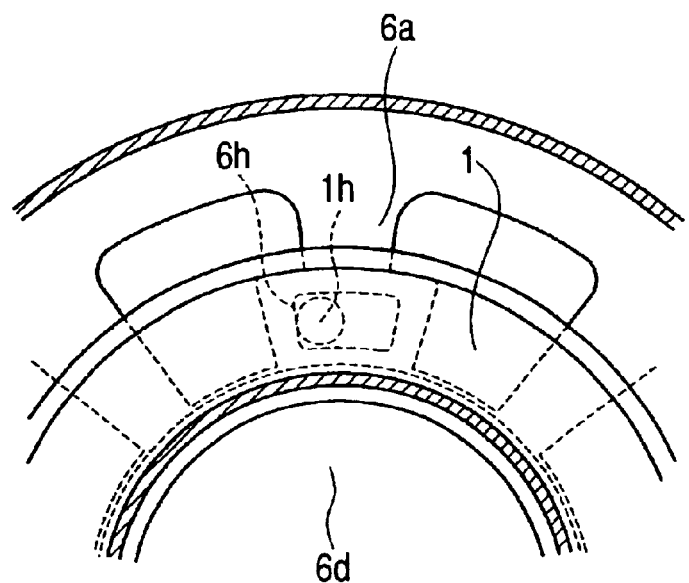
FIG. 3 is a cross sectional view taken along a line segment B—B of FIG. 2 when light quantity controlling blades are open.
Figure 4:
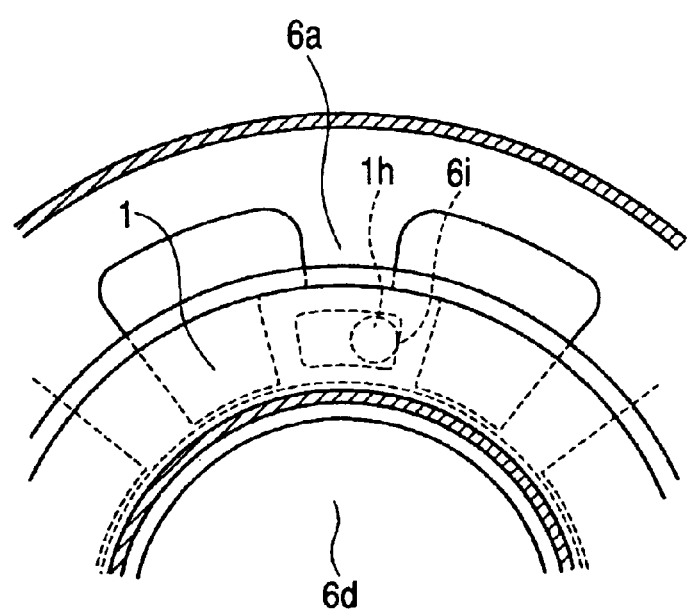
FIG. 4 is a cross sectional view taken along the line segment B—B of FIG. 2 when the light quantity controlling blades are closed.

FIG. 3 and FIG. 4 are diagrams for explaining rotary operation of the magnet 1 provided to the light quantity control device, and show cross sectional views along a line segment B—B of FIG. 2. It should be noted that only the magnet 1, the driver pin 1h, and the second stator 6 are shown in order to make operation of the magnet 1 easy to understand.

FIG. 3 is a diagram of a state where the driver pin 1h of the magnet 1 comes in contact with the stopper 6h of the second stator 6 during reverse energization of the coil 3. FIG. 4 shows a state where the driver pin 1h of the magnet 1 comes in contact the stopper 6i of the second stator 6 during forward energization of the coil 3.

First, the coil 3 is energized (reverse energization) to magnetically excite the first magnetic pole portions 5a of the first stator 5 to the N pole, and the second magnetic pole portions 6a of the second stator 6 to the S pole, to thereby rotate the magnet 1 in the clockwise direction. As shown in FIG. 4, the driver pin 1h rotates until coming in contact with the stopper 6i. In accordance with the rotation of the driver pin, the light quantity control blades 7 and 8 each rotate in the counterclockwise direction. The light quantity control blades 7 and 8 move to mutually overlap, closing the opening portion 6d. On the other hand, when the coil 3 is energized in the opposite direction (forward energization) to magnetically excite the magnetic pole portions 5a of the first stator 5 to the S pole and the magnetic pole portions 6a of the second stator 6 to the N pole, the magnet 1 rotates in a counterclockwise direction. As shown in FIG. 3, the driver pin 1h rotates until coming in contact with the stopper 6h. In accordance with the rotation of the driver pin, the light quantity control blades each rotate in the clockwise direction. The light quantity control blades 7 and 8 move to separate from each other, opening the opening portion 6d (maximum opening).

It should be noted that a driving principle of the magnet 1, and a relationship between the energization direction of the coil 3 and the rotational direction of the magnet 1 due to the magnetic excitation are known. Detailed explanations are therefore omitted here.

A reason that the driver device of this embodiment can be made smaller is explained here. First, the coil is disposed on the outside (or the inside) of the magnet, and the thicknesses of the coil and the magnet are the same. Accordingly, a region ensured within the driver device to be occupied by the magnet and the coil may be an amount corresponding to the thickness of the magnet (or an amount corresponding to the thickness of the coil). Main portions of the magnet (excluding the convex portion 1a) are formed by flat ring shapes, and therefore the thickness of the magnet itself can easily be made thinner. Further, the first magnetic pole portions and the second magnetic pole portions that sandwich the magnet in the axial direction (in other words, a direction that is orthogonal to the axial direction of the magnet) take on a shape in which holes are formed along the circumferential direction in a circular flat plate having an opening portion in its center. This is a flat plate shape that does not require unevenness in its surface in the axial direction, and therefore can be easily made thin. Further, for the reasons described above, it is necessary to provide a predetermined gap between the magnet and the stator, but the light quantity controlling blades can be stored in an inner portion of the gap. In addition, it is not necessary to provide a separate base plate for rotating the light quantity controlling blades as in a conventional device. According to the reasons described above, it therefore becomes possible to make the entire light quantity adjusting device extremely thin in the axial direction.

Furthermore, the magnet is disposed between the first magnetic pole portions and the second magnetic pole portions that are magnetically excited to inverse polarities by energizing the coil. A substantial portion of the magnetic flux that flows out from one of the magnetic pole portions therefore passes through the magnet and flows into the other magnetic pole portions. The rotary output of the magnet thus increases. The light quantity controlling blades 7 and 8 that are made by using non-magnetic members that do not influence the flow of the magnetic flux are disposed between the first magnet 1 and the second stator 6. Accordingly, there is little magnetic reluctance, and magnetic force lines generated by the coil 3 effectively act on the magnet 1, resulting in a high output actuator. As a result, a thin, high efficiency light quantity control device can be configured.

It should be noted that the amount of light at a maximum opening can easily be set by changing the size of the opening portion in the center of the magnet and the stator. A lens can also be disposed within the opening portion.

In addition, the flange portion 4a that is provided in the bobbin 4 and the outer circumferential portion of the magnet 1 (the step portion 1b) are superimposed over their entire circumferences when seen from the axial direction. It therefore becomes possible to reliably prevent unnecessary light rays other than those from a necessary light path from being incident (that is, direct incident light rays that enter in the gap between the fixed bobbin 4 and the rotating magnet 1). A bobbin need not be provided in the position that superimposes with the magnet. For example, a stator may also be provided.

In addition, the receiving surface (2a) that protrudes out in the radial direction is provided in the bearing 2 in order to regulate the position of the rotating magnet 1 in the axial direction in order to ensure a rotary space for the light quantity controlling blades 7 and 8 within the device. The magnet therefore does not come in contact with the light quantity controlling blades 7 and 8, and the light quantity controlling blades 7 and 8 and the magnet 1 can therefore rotate without mutual interference. Further, the receiving surface 6e is provided on a rail having good slidability in the second stator 6. The light quantity controlling blades 7 and 8 therefore move without fail.

It should be noted that although a configuration is shown where the light quantity controlling blades 7 and 8 are disposed within the second air gap, the light quantity controlling blades 7 and 8 may of course also be disposed within the first air gap. Further, although a pair of blades are used as the light quantity controlling members here, the number may also be increased. Only one blade may also be used. Further, although a shutter device in which the light path is completely closed is explained here as the light quantity adjusting device, a device that causes the opening diameter to change in a plurality of steps may also be used as an aperture device. A light quantity controlling member that controls the amount of light that passes (is transmitted) according to its density, such as an ND filter, may also be used. Specifically, a plurality of semitransparent portions having different densities may be used, and semitransparent portions of arbitrary densities may be placed into and taken out of the opening portion. It should be noted that a plurality of semitransparent portions or a single semitransparent portion may be used in this case.

It thus becomes possible to provide a thin light quantity adjusting device having high output at low cost.

Figure 5:
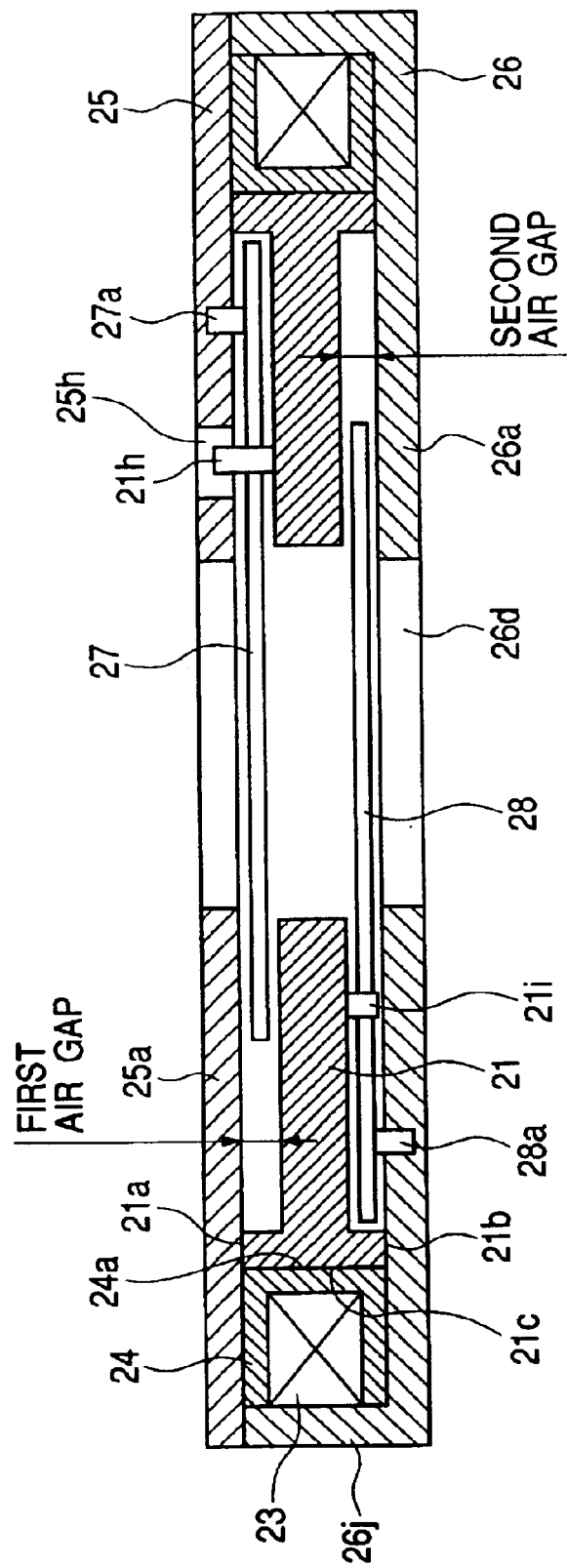
FIG. 5 is a cross sectional view that shows a light quantity adjusting device according to a second embodiment of the present invention.
Figure 6:
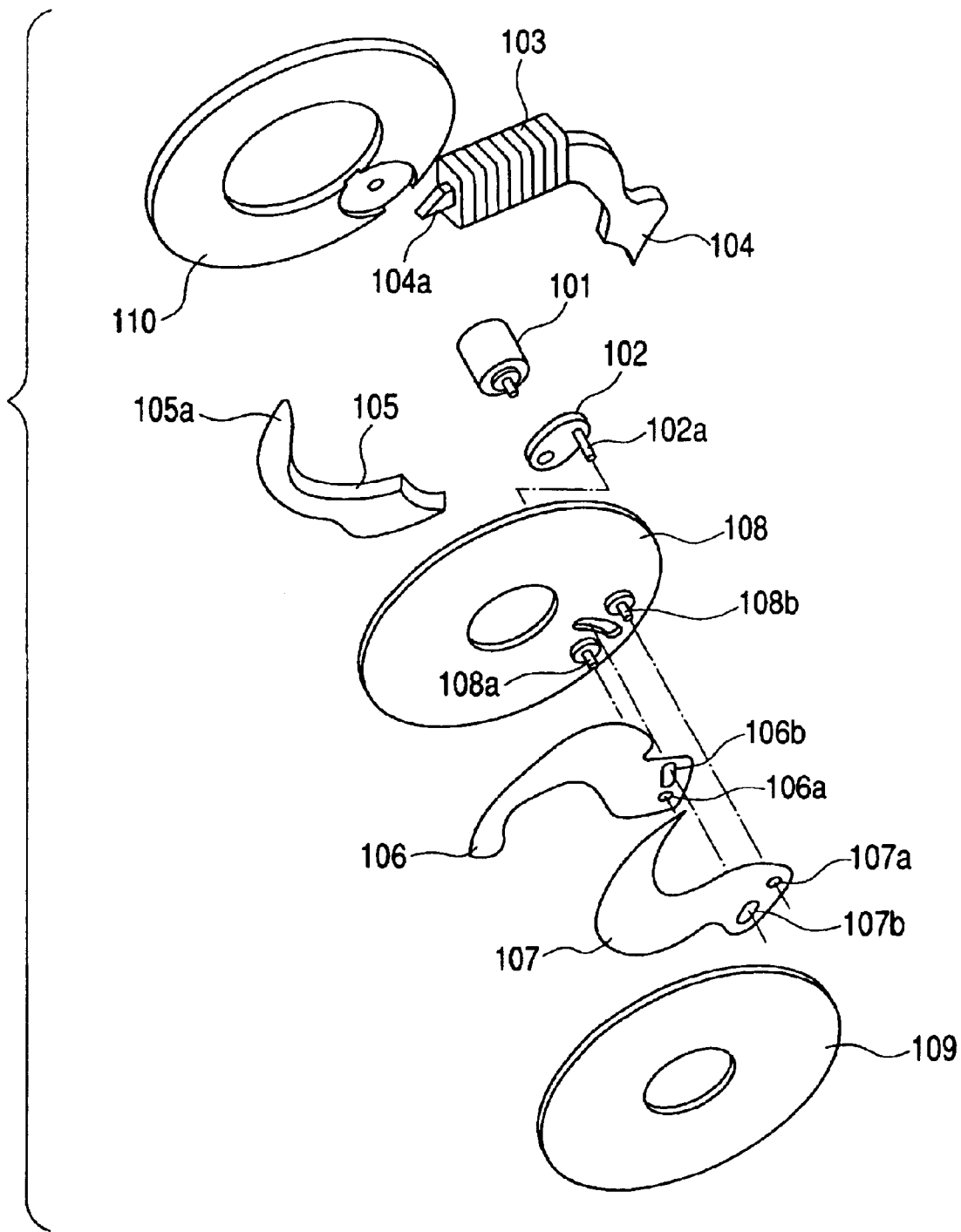
FIG. 6 is an exploded perspective view that shows a conventional light quantity adjusting device.

FIG. 5 is a diagram that shows a cross section of a light quantity adjusting device according to a second embodiment of the present invention.

Reference numeral 21 in FIG. 5 denotes an annular (ring shape) magnet that is made from a plastic magnetic material. A rotation center at the center of the annular rotary member is taken as a virtual axis. One surface and another surface perpendicular to the virtual axis (in other words, surfaces that are parallel with an axial direction of the magnet) are divided 16 times in a circumferential direction, and the 16 divisions alternately are magnetized in S and N poles. Further, rear surfaces of the 16 divisions have opposite poles. Although the annular rotary member is divided into 16 portions and magnetized in this embodiment, the number of magnetized poles may be any other number equal to or greater than two. Convex portions 21a and 21b project in both sides of an outer circumferential portion of the magnet 21 in both axial directions. The convex portion 21a smoothly slides on a first stator 25 when the magnet 21 rotates, and the convex portion 21b smoothly slides on a second stator 26. The convex portion 21a on one surface of the magnet 21 comes in contact with the first stator 25, and the convex portion 21b on the other surface of the magnet 21 comes in contact with the stator 26. The position of the magnet 21 in the axial direction is thus determined. Reference numeral 21c denotes sliding surface along which an inner circumferential portion of a bobbin 24 slides.

Reference numeral 23 denotes an annular coil. The annular coil 23 is wrapped around the bobbin 24 that is formed having a "U" shape by using an electrically insulating material. The coil 23 is disposed outside of the magnet 21 in a radial direction, and a center position of the coil 23 is the same as that of the magnet 21.

The annular first stator 25 is made by using a soft magnetic material, and possesses first magnetic pole portions 25a that are magnetically excited by the coil 23. The first magnetic pole portions 25a are configured, as in FIG. 1, by flat plate comb tooth shapes that oppose a first plane (one surface) perpendicular to the axial direction of the annular magnet 21 with a predetermined gap (first air gap), and which extend in the radial direction of the magnet 21 and moreover, extend in an inner radial direction of the magnet 21. The number of the extending comb shape first magnetic pole portions 25a is equal to n/2 where n is taken as the number of magnetization divisions of the magnet 21. The first magnetic pole portions 25a are disposed uniformly in increments (8 here) of 720/n degrees (45 degrees in this embodiment).

The first magnetic pole portions 25a are all magnetically excited to take on the same polarity by energizing the coil 23.

The annular second stator 26 is made by using a soft magnetic material, and possesses second magnetic pole portions 26a that are magnetically excited by exciting the coil 23. The second magnetic pole portions 26a are configured by flat plate comb tooth shapes that oppose a second plane (another surface) that is perpendicular to the axial direction of the annular magnet 21 with a predetermined gap (second air gap), and which extend in the radial direction of the magnet 21 and moreover, extend in an inner radial direction of the magnet 21. The number of the extending comb shape second magnetic pole portions 26a is equal to one-half of the n magnetization divisions of the magnet 21. The second magnetic pole portions 26a are disposed uniformly in increments (8 here) of 720/n degrees (45 degrees in this embodiment).

The second magnetic pole portions 26a are all magnetically excited to take on the same polarity, and moreover, to take on a polarity that is opposite that of the first magnetic pole portions 25a, by energizing the coil 23. The second magnetic pole portions 26a of the second stator 26 are formed in positions opposite the first magnetic pole portions 25a of the first stator 25, thus sandwiching the magnet 21. The first stator 25 and the second stator 26 are magnetically coupled by a rising wall shape junction portion 26j of an outermost circumferential portion of the second stator 26. Of the first stator 25 and the second stator 26, only the rising wall shape junction portion 26j comes in contact with the coil 23. Similar to the first embodiment, the magnet 21, the coil 23, the first stator 25, and the second stator 26 configure a magnetic circuit.

A light quantity control blade 27 is disposed in the first air gap between the first stator 25 and the magnet 21. A light quantity control blade 28 is disposed in the second air gap between the second stator 26 and the magnet 21.

The light quantity control blades 27 and 28 are formed by using a non-magnetic material such as carbon, and have a sufficient light blocking function for blocking light rays. The light quantity control blade 27 has a rotary axis 27a in its center of rotation, and is rotatably fitted into a hole of the first stator 25. The light quantity control blade 28 has a rotary axis 28a in its center of rotation, and is rotatably fitted into a hole of the second stator 26.

A driver pin 21h is provided to the magnet 21 on the first stator 25 side, and a driver pin 21i is provided to the magnet 21 on the second stator 26 side. The driver pins 21h and 21i are rotatably fitted into slots 27b and 28b of the light quantity controlling blades 27 and 28, respectively. The driver pin 21h extends past the center of the plate thickness of the first stator 25 after passing through the light quantity adjusting device 27, and comes in contact with a stopper portion 25h of the first stator 25 as a means of regulating the maximum rotary angle when the magnet 21 rotates.

The light quantity control blades 27 and 28 thus rotate according to rotation of the magnet 21, and an opening amount of (amount of light that passes through) an opening portion 26d of the second stator 26 can be changed.

The light quantity control blade 27 is disposed in the first air gap between the first stator 25 and the magnet 21, and the second light quantity control blade 28 is disposed in the second air gap between the second stator 26 and the magnet 21 in the second embodiment as described above. The light quantity controlling blades may be disposed in both the first air gap and the second air gap, and as a result are each disposed in separate air gaps. This therefore becomes a layout having additional space efficiency.

The second embodiment also has the effects similar to those described in the first embodiment. Furthermore, ND filters may also be used instead of the light quantity controlling blades.

A configuration is used with conventional devices in which two units overlap, a base plate unit and a driver device that is a driver for light quantity control members. The embodiments described above do not use the conventional configuration. The base plate unit is done away with, and light quantity control blades or light quantity controlling members that are made by using ND filters having semi-transparent portions of different densities are disposed within the driver device. The thickness in an optical axis direction of the light quantity adjusting device can therefore be made extremely small, and the overall device can be made thin and low cost. Furthermore, by forming the light quantity controlling members by using a non-magnetic materials, there is no harm to the efficiency of the magnetic circuit formed by the magnet, the coil, and the stators.

What is claimed is:

1. A light quantity adjusting device comprising:
   an annular rotary member having a magnetizing portion in a plane that is parallel to a radial direction of the annular rotary member;
   an annular coil disposed in an outer diameter side or an inner diameter side of the rotary member;
   an annular first stator disposed in a direction that is orthogonal to a radial direction of the rotary member, the annular first stator comprising first magnetic pole portions that oppose the rotary member;
   an annular second stator disposed in a direction that is orthogonal to the radial direction of the rotary member, the annular second stator comprising second magnetic pole portions that oppose the rotary member from an opposite side of the first magnetic pole portions; and one or more light controlling members that are disposed between the rotary member and the first stator and/or between the rotary member and the second stator and that move into, and out of, a light path according to rotation of the rotary member, controlling the quantity of light that passes through, the light path being a path for light passing therethrough opening portions of the rotary member, the coil, the first stator, and the second stator.

2. A light quantity adjusting device according to claim 1, wherein the surface area of an opening portion formed in the light path is changed by moving the one or more light quantity controlling members into and out of the light path.

3. A light quantity adjusting device according to claim 1, wherein the one or more light quantity controlling members are semitransparent members, and the transmittance of the light path is changed by moving the one or more light quantity controlling members into and out of the light path.

4. A light quantity adjusting device according to claim 1, wherein the one or more light quantity controlling members are formed by using a non-magnetic material.

5. A light quantity adjusting device according to claim 1, further comprising a bobbin that winds around the coil, wherein the magnet and the bobbin are positioned to be superimposed over their entire circumferences when seen from a center axial direction.

6. A light quantity adjusting device comprising:

an annular magnet;

an annular coil disposed outside or inside of said annular magnet;

annular stators provided in one side facing said magnet and the other side facing said magnet in a direction of rotation axis of said magnet; and a light quantity adjusting member disposed between said magnet and one of said stators, wherein said light quantity adjusting member is adapted to adjust quantity of the light passing through opening portions of said magnet, said coil and said stators in association with the rotation of said magnet.

7. A light quantity adjusting device according to claim 6, wherein said stator comprises a first stator having first magnetic pole portions that oppose said magnet and a second stator having second magnet pole portions that oppose said magnet from an opposite side of the first magnet pole portions.

8. A light quantity adjusting device according to claim 6, wherein an area of the opening provided on the light traveling path is changed by causing said light quantity adjusting member to move into or out of the light traveling path.

9. A light quantity adjusting device according to claim 6, wherein said light quantity adjusting member is a semitransparent member and the transmittance of said light traveling path is changed by causing said light quantity adjusting member to move into or out of said light traveling path.

10. A light quantity adjusting device according to claim 6, wherein said light quantity adjusting member is formed by using a non-magnetic material.

11. A light quantity adjusting device according to claim 6 further comprising a bobbin around which said coil is wound, wherein said magnet and said bobbin have overlapping portions over their circumferences when seen from a center axial direction.

* * * * *